United States Patent

Wegner

Patent Number: 4,666,181
Date of Patent: May 19, 1987

[54] INSIDE LOADER, EMBODIED AS A SEMI-TRAILER FOR A TRACTOR TRUCK, FOR OVER-THE-ROAD TRANSPORT FRAMES, IN PARTICULAR FOR TRANSPORTING FLAT GLASS

[75] Inventor: Alfons Wegner, Olfen, Fed. Rep. of Germany

[73] Assignee: Fahrzeugbau Langendorf GmbH & Co., KG, Fed. Rep. of Germany

[21] Appl. No.: 805,777

[22] Filed: Dec. 6, 1985

[30] Foreign Application Priority Data

Mar. 4, 1985 [DE] Fed. Rep. of Germany ....... 3507587

[51] Int. Cl.$^4$ ..................... B62D 53/06; B60G 25/00
[52] U.S. Cl. .................................. 280/711; 280/5 F; 280/43.23; 280/439
[58] Field of Search .................... 280/439, 43.23, 711, 280/5 F; 414/340, 343

[56] References Cited

U.S. PATENT DOCUMENTS

| 2,821,409 | 1/1958 | Chalmers | 280/439 |
| 2,849,129 | 8/1958 | Likens | 414/340 |
| 4,493,491 | 1/1985 | Karlik | 280/43.23 |

FOREIGN PATENT DOCUMENTS

990426  9/1951  France ........................ 280/5 F

Primary Examiner—John J. Love
Assistant Examiner—Kenneth R. Rice
Attorney, Agent, or Firm—Reese Taylor

[57] ABSTRACT

An inside loader, embodied as a semi-trailer for a tractor truck for over-the-road transport of transport frames for transporting flat sheets in a carrying frame having parallel longitudinal members, on the outside of which axle rockers, supported on air suspension bellows, are articulated to support a plurality of rear wheels. On the inside of each of which a profiled supporting section is secured, wherein, in order to load a transport frame, the semi-trailer is backed up, with its air springs deflated and with its longitudinal members enclosing the transport frame, in such a way that the profiled supporting sections of the longitudinal members of the frame coincide vertically with longitudinal members of the transport frame, which, at the end of the reverse movement, is raised into the transport position through inflation of the air spring bellows. The trailer coupling is disposed on a rocker supported by an air spring and the axle rocker of the rear wheels has a stop for emergency operation of the trailer in case of deflated air springs. The stop can be disengaged for the purpose of loading and unloading, wherein the section heights of the support sections and the longitudinal frame sections of the transport frame overlap in such a way that the semi-trailer, with the stops disengaged and axle and coupling rocker springs deflated, can be moved with sufficient ground clearance. The transport sections vertically overlap the sections of the longitudinal frame members of the transport frame, which rests with its frame directly on the base while still providing clearance.

7 Claims, 6 Drawing Figures

INSIDE LOADER, EMBODIED AS A SEMI-TRAILER FOR A TRACTOR TRUCK, FOR OVER-THE-ROAD TRANSPORT FRAMES, IN PARTICULAR FOR TRANSPORTING FLAT GLASS

RELATED APPLICATIONS

This application claims priority under 35 U.S.C. 119 based on Federal Repubic of Germany Application P 35 07 587.2 filed Mar. 4, 1985.

BACKGROUND OF THE INVENTION

The invention consists of an inside loader in the form of a semi-trailer with a tractor, used for over-the-road transport of transport frames, especially for the transport of flat sheets of glass.

The over-the-road transport of transport frames, having considerable weight in the loaded state, for instance more than 20 metric tons, as well as being of large dimensions, is being done in connection with various goods. In general, the transport frames have a basic frame and a support with sides inclined towards the inside for the support of the goods to be transported, which rests on the basic frame. Generally a plurality of plate-like elements is transported on each side of a transport frame. The present invention is concerned with plate-like goods which are especially susceptible to breakage and cracks. These include especially flat glass, which is, for instance, produced in large sheets by a float process and is loaded on both sides of a transport frame. Different from this are, for instance, large concrete plate elements used for plate construction, because of their small breakage or cracking susceptibility. This is of basic consideration when constructing the frame, since the suspension for the latter, more resistant goods, can be considerably stiffer and is therefore generally of the hydraulic type. Furthermore, the inside loaders in accordance with the present invention can be completely covered while being transported over the road by means of a tarpaulin.

SUMMARY OF THE INVENTION

The invention is further explained by the example of the transport of flat glass, which necessitates the use of air suspension of the vehicle in order to avoid damage in transit through breakage. The inside loader in accordance with the present invention can, as a rule, accept one of the transport frames described, loaded with several sheets of glass, and is adjusted to their height in such a way that the maximum height of 4 m is not exceeded when the transport frame is loaded and covered with a tarpaulin. This limits the height of the sheet of plate glass which can be placed on the transport frame. The length of the transport frame can be easily accommodated in the opening between the longitudinal frame members of the chassis. These are secured by a cross beam in front and by a door in the rear, which is closed after the transport frame has been loaded. The semi-trailer has, under the usual forward overhang, the trailer coupling for a normal semi-tractor, i.e., generally the king pin which engages the fifth wheel of the coupling disposed on the tractor.

The air spring bellows of the inside loader in accordance with the present invention provide the suspension (during over-the-road transport) of the rockers to which the axles of the rear wheels are fastened; at the same time they serve as lifting means during the loading and unloading of the transport frame. In order to lower the chassis, the air is bled from the springs. The vehicle in accordance with the present invention usually has a sufficient air supply, carried in pressurized containers, to refill the air springs in order to raise the semi-trailer, so that the engine of the tractor need not be used for generating air by means of a compressor for loading or unloading. The pressure tanks are normally refilled during travel by the compressor of the vehicle.

The inside loader in accordance with the present invention therefore makes possible the loading and unloading of a transport frame exclusively with means available in the vehicle. When the vehicle in accordance with the present invention is moved for loading or unloading there is sufficient free play between the support sections of the vehicle and the longitudinal frame members of the transport frame to unite or separate the vehicle and the transport frame without collision. Furthermore, by lifting the axles above the rockers, the vertical play can be cancelled and the transport frame can have sufficient clearance, as required in the over-the-road transport.

The invention is based on an already known inside loader for the transport of glass. Only such transport frames can be used in connection with this vehicle having a base frame which is supported by forward and rear lower rests. The reason for this is that the inside loader must maintain a minimal clearance should the air escape from the air springs, resulting in an emergency operating mode in case the vehicle loses so much air on the road because of a leak that its pressurization system cannot make up the loss in transit. This minimum lower clearance of the emergency mode limits the minimal height of the support sections above the base of the inside loader, which support sections engage from below the longitudinal frame sections of the transport frame, formed by angle sections open inwardly and downwardly, the transport frame being kept at the required miminal height by the lower rests.

The lower rests are disadvantageous, for instance, because they must be retractable for use in over-the-road transport and extendible for putting down the transport frame. They therefore presuppose a necessary technical effort. Additionally, they represent a considerable weight, which reduces the usable load. In actual use their operation also presents difficulties. Especially the wrong employment of the lower rests may lead to considerable damages in transport. Finally, the lower rests already have to be used when the transport frame is unloaded at the glass factory. This requires an intermediate transport of the cut sheets of glass from the conveyor to the transport frame, thereby considerably increasing the amount of labor in the glass factory.

The purpose of the present invention is to provide an inside loader of the known species making it possible, with self-contained means, to load and unload a transport frame, which rests with its base frame directly on the ground on which the vehicle sits, therefore not requiring lower rests.

In accordance with the present invention it is possible to lower the overhang of the semi-trailer, by means of bleeding the air from the rocker spring of the trailer coupling and from the air springs. This makes it possible to lower the semi-trailer evenly until minimum clearance, which still permits movement of the vehicle over the ground, is achieved. In this position of the semi-trailer the necessary freedom of movement over the entire length of the support sections and the frame sections is insured, so that the transport frame and the vehicle can be brought together for loading and after unloading can be separated. The ground clearance of the semi-trailer for road travel is restored by refilling the rocker spring at the trailer coupling and the axle springs. The inserted stops insure the ground clearance of the semi-trailer on the road under emergency conditions, which is greater than the minimum ground clearance during loading and unloading, the latter can only be achieved when the stops are removed.

The present invention has the advantage of not requiring the lower rests up to now needed for transport frames. This makes a higher usable load possible, simplifies the operation of the transport frame and the semi-trailer and avoids wrong handling and the transport damages connected therewith. Furthermore, the transport frames can be loaded at the glass factory directly from the conveyors. Since it is possible to lower the semi-trailer more than before during loading and unloading, support sections can now be fastened to the longitudinal members of the frame at a lower height, thereby increasing the usable height of the transport frame. In fact, taller glass sheets can be transported because of this.

Preferably, the stops are mechanically realized by a lug cam articulated on the axle rocker next to the air spring support and an abutment for that support on the respective longitudinal frame member. They are installed and removed by the driver; this can be done in a relatively simple manner.

The requirement for air of an inside loader in accordance with the present invention is relatively greater than before. This is a result not only of the increased play of the air spring bellows at the axle rockers, but also of the additional air spring at the trailer coupling rocker. Therefore it becomes advantageous to provide an increased air supply by means of the hollow insides of the longitudinal frame members which can be used to receive compressed air for inflating the air springs.

The support sections are composed of rectangular tubing and the longitudinal frame members are U-shaped sections open to the outside so that these supports and frame members can be adjusted to one another, thereby achieving the necessary strength of the frame and also the positive locking of both sections in both vertical directions.

The loader is provided with a catch hook which extends from the forward end for cooperation with a cross member on the transport frame and with the back of the hook protruding from the forward end for engagement and disengagement with a transport catch. In this fashion, it becomes possible for the driver of the vehicle to pack up the semi-trailer sufficiently far during the loading of a transport frame, since the engagement of the catch hook only becomes possible when the transport frame rests against the front cross beam of the chassis. Thus the shifting of the transport frame forward and the damages generally associated therewith during a sudden deceleration of the semi-trailer is avoided.

Details, further characteristics and other advantages of the present invention can be seen from the ensuing description of an embodiment by means of the figures in the drawings.

BRIEF DESCRIPTION OF THE PREFERRED EMBODIMENTS

Figure 1:
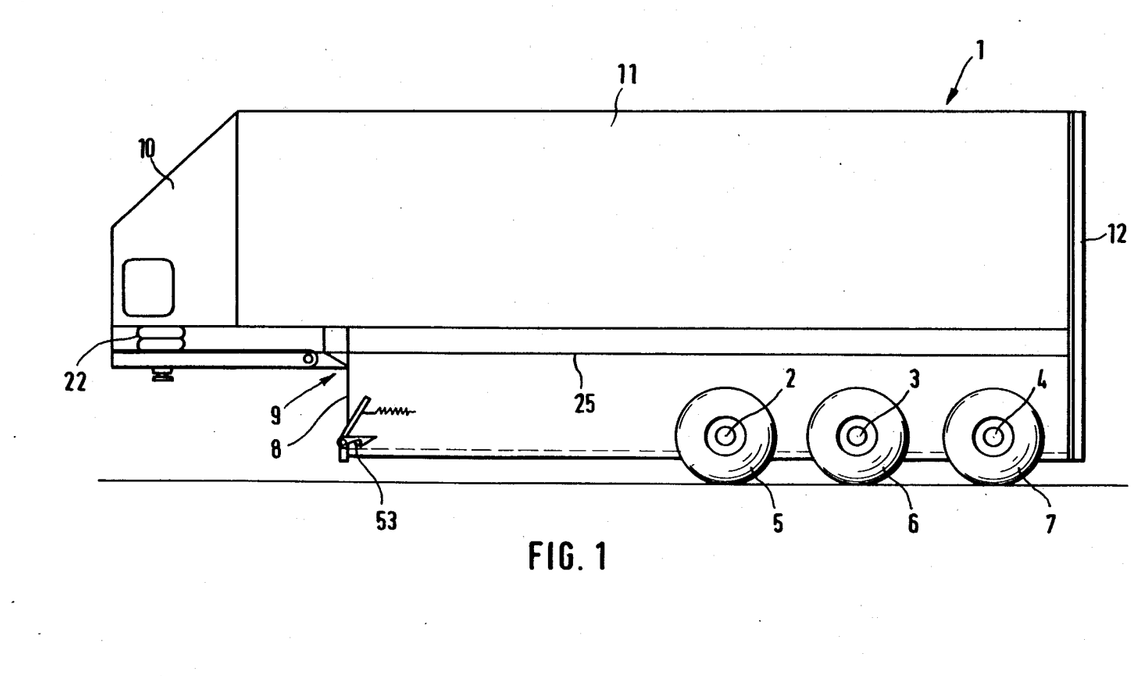
FIG. 1 shows the semi-trailer of an inside loader in accordance with the present invention in profile, leaving out all details not required for understanding.

The semi-trailer, generally indicated as 1, is used for the transport of flat sheets of glass. It has three separate rear axles 2 to 4 with single wheels 5 to 7. The chassis has a goose neck connected to the forward cross beam 8 by an overhang 9. The loading area is closed at 10 at its front; is covered by a tarpaulin 11 over its length and can be closed at the back by a gate 12 which can be swung open or closed.

Figure 2:
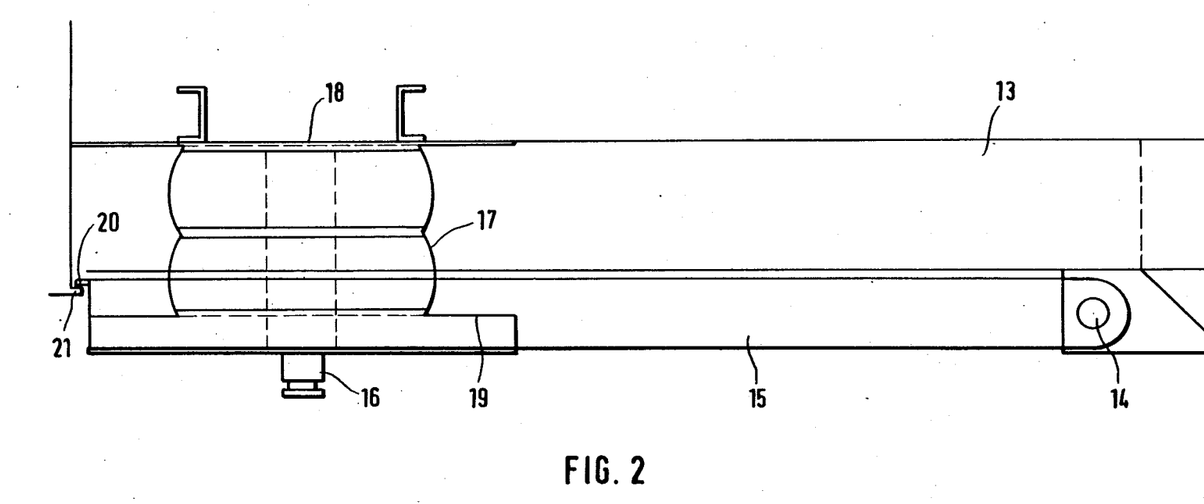
FIG. 2 shows a detail of FIG. 1 in enlargement to show the trailer coupling disposed on the overhang of the semi-trailer.
Figure 3:
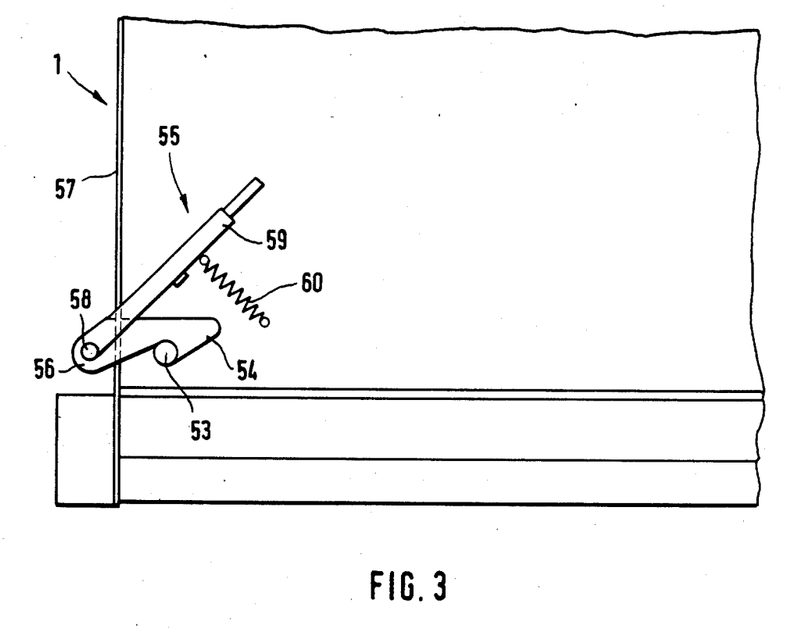
FIG. 3 shows a transport restraint in accordance with the present invention in the activated state, wherein the parts have generally been shown as in FIG. 1.

The goose neck support 13 forming the overhang 9 has a horizontal swivel joint 14 in the immediate vicinity of the overhang 9. A rocker 15 is hinged to the swivel coupling. The rocker is supported by means of one or several air spring bellows 17 against a yoke 18 of the support 13. For this purpose the spring bellows 17 are seated on a platform 19 fastened to the rocker 15. Additionally, the rocker 15 has a front limiting bar 20 cooperating with a rear limiting bar 21 of the support 13, limiting the oscillation movements counterclockwise in the embodiment according to FIG. 2 by means of the spring bellows 17. In this manner the vehicle is also suspended at the overhang 9 by means of the air spring generally designated as 22, which consists of the spring bellows 17.

Figure 5:
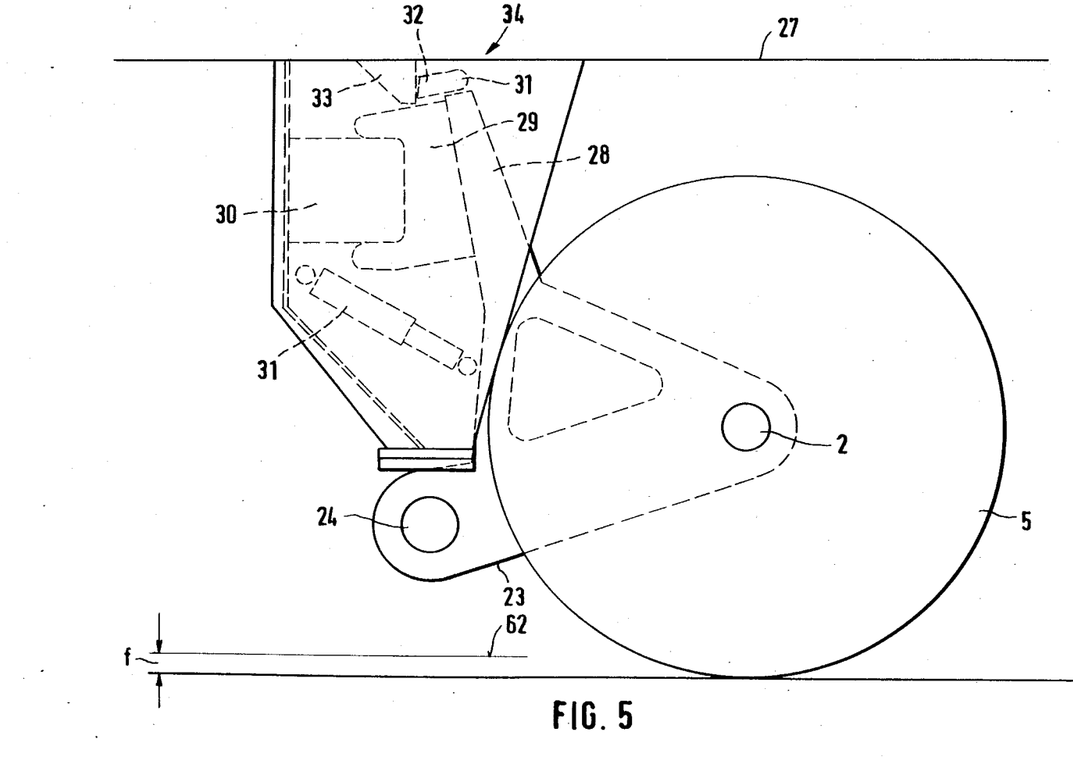
FIG. 5 shows in fragmentary view one of the rear axles of the semi-trailer during emergency operation on the road because of a leak in the compressed air suspension.
Figure 6:
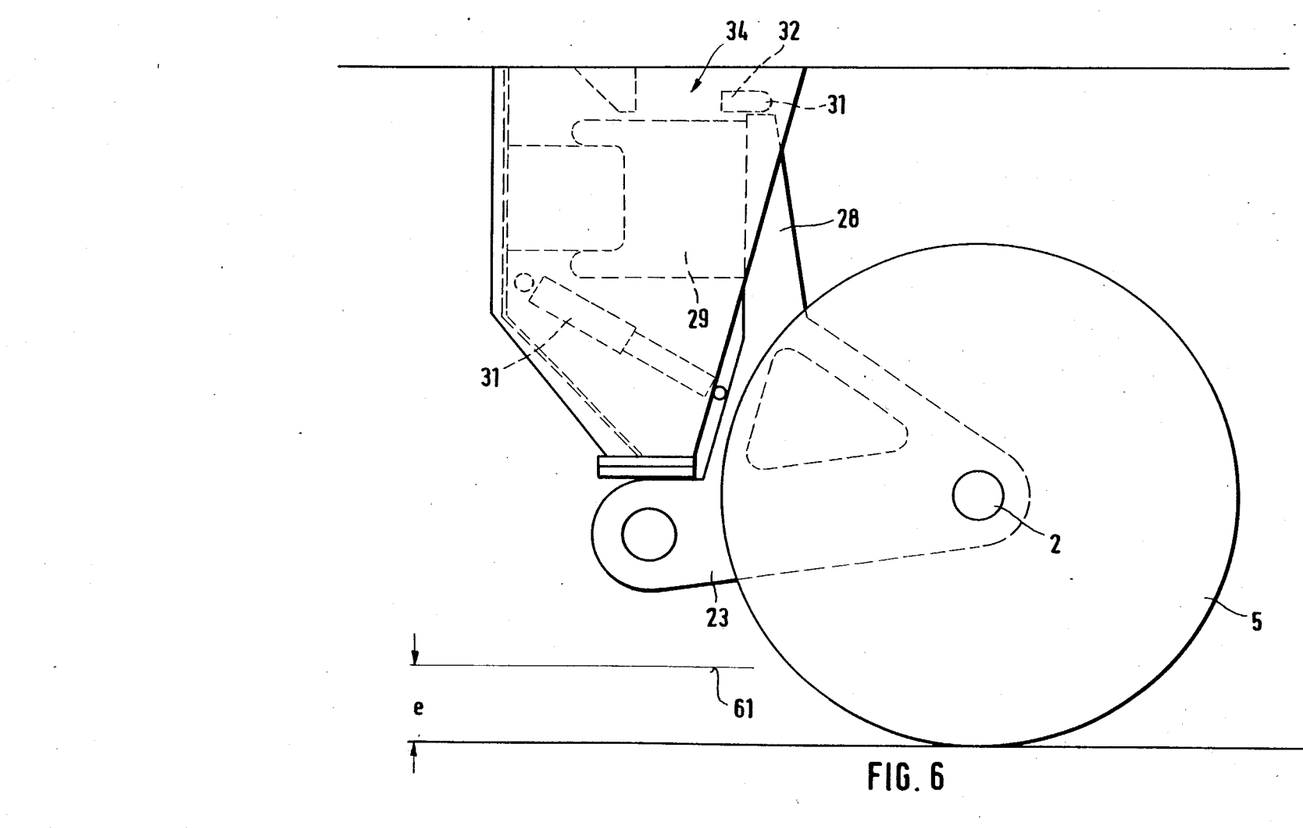
FIG. 6 shows a corresponding view to FIG. 5 of the rear axle during normal operation on the road.

Referring to FIGS. 5 and 6, the rear wheel axles are disposed on triangular shaped rockers 23. The rocker joint 24 is disposed on the outside of one of the two longitudinal frame members of the chassis, which are held together by means of the cross member 8 and the closed door 12. The rockers 23 of the rear wheels are located underneath the longitudinal straps 27 of the longitudinal frame members. The axle of the rear wheel 5 is disposed in the top part of the rocker at 2, the rear wheel being indicated as 5. The longer arm 28 of the rocker 23 serves to support an air spring bellows 29, the abutment for which is shown at 30. A telescopic shock absorber 31 supports the longer arm 28 of the rocker 23.

At the point of the longer arm 28 a swivel joint 31a is located, to which is hinged a lug cam 32. The lug cam cooperates with an abutment located underneath the strap 27.

The stop means 34, consisting of the cam lug 32 and the abutment 33, fixedly attached to the longitudinal support, is installed in the position shown in FIG. 5. It prevents the rocker 23 from moving around the rocker joint 24 in a counterclockwise direction when the spring bellows 29 is deflated.

In accordance with the depiction in FIG. 6, the stop 34 is also installed by means of the pivoting of the lug cam 32 in its swivel joint 31a on the free end of the rocker 23. However, the air spring 29 is inflated, so that the shock absorber 31 is fully extended. Therefore the axle 2 has assumed its working position for road operation.

When a transport frame 35 (FIG. 4) is to be loaded or unloaded, the cam 32 is turned back in its joint 31a. In this case and with the air spring 29 not under pressure, the rocker 23 can move further in a clockwise direction until it comes to the end. In this case there is a minimal ground clearance b, which, although it permits the movement of the semi-trailer at the base 36, is not sufficient for road movement.

Figure 4:
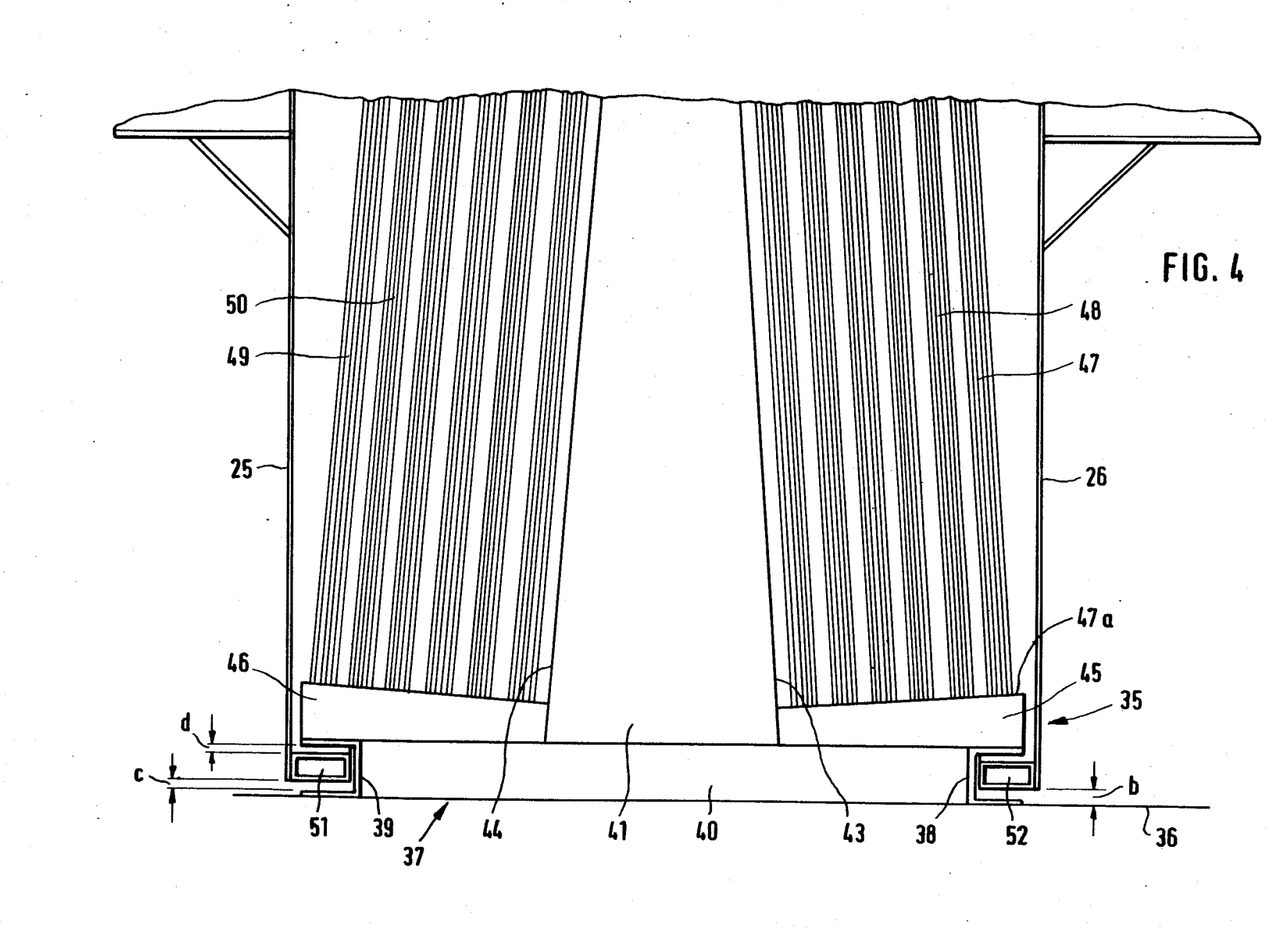
FIG. 4 shows a frontal view of a transport frame in accordance with the present invention during loading into an inside loader in accordance with the present invention, wherein the parts have been fragmentarily shown.

The transport frame has been schematically shown in FIG. 4. It consists of a base frame 37 having a plurality of steel segments rigidly connected with each other. The longitudinal frame members 38, 39 are sections open to the outside and are kept apart by traverse pieces 40. A vertical frame 41 has been installed on the base frame 37, having sides 43, 44, inclined inwardly and upwardly. Several supports 45, 46 having support areas 47a inclined from the outside to the inside have been installed on the frame next to the vertical frame 41. By means of this it is possible to place against each side 43, 44 a plurality of glass sheets 47, 48, or 49 and 50, or plates, which lean against the sides 43, 44. The goods 47 to 50 may be secured in this position with the aid of cross braces.

One support section 51, 52 each is disposed at the inside of the longitudinal frame members 25, 26. In accordance with the exemplary embodiment shown they are of rectangular shape. The height of the rectangular sections is tailored to the height of the free inner space of the U-sections 38, 39 in such a way, that the support sections 51, 52 while the emergency run stops 34 are disengaged, the axle springs 29 as well as the rocker spring 22 deflated, have a free play c, d in the vertical overlapping of the sections shown, thus making possible a collision-free movement of the semi-trailer. The free play c is slightly less than the minimal ground clearance b, which can be seen in FIG. 4.

In actual operation the loaded transport frame 35 rests with its members 40 on the base 36, on which the semi-trailer 1 moves. After the minimal road clearance has been achieved in the manner shown, the semi-trailer 1 is backed up with the door 12 open, wherein the rectangular support sections 51, 52 move in the U-sections 38, 39 of the frame 40 with the described free play c, d. At the front end of the frame 40 a cross bolt 53 is located, which cooperates with a catch hook 54 of a transport catch 55 disposed at the front end of the semi-trailer 1. The catch hook extends with its free end from the front end 57 of the semi-trailer and therefore is visible to the driver. He can swivel the catch hook by means of a horizontal joint 58, also located on the outside, wherein a lever 59 tensions a spring 60. The swiveling and catching of the hook 54 indicates that the semi-trailer 1 has been backed up sufficiently for the transport frame 40 to have reached its desired position inside the semi-trailer.

As soon as this occurs, compressed air is applied to the axle springs 29 as well as to the air springs 22 of the trailer coupling rocker 15, whereby these springs are extended and lift the vehicle. The lower edge of the transport frame 40 finally reaches the line 61 shown in FIG. 6, which also indicates the ground clearance necessary for operation over the road. As soon as this is achieved, the driver puts the lug cams 32 into the position shown in FIGS. 5 and 6, thereby securing the emergency operation of the vehicle in case of a possible leakage from the springs 29. If this occurs, the lower edge of the transport frame 40 assumes the position of line 62 in FIG. 5, which shows the ground clearance of the vehicle under emergency running conditions.

The interior of the longitudinal vehicle sections 25, 26 can be formed as pressure vessels wherein the required supply of compressed air necessary for the inflation of the springs 22 and 29 can be stored. This compressed air supply, however, can also be stored in pressure tanks fixedly attached to suitable places on the semi-trailer.

Once the vehicle has reached its destination, the driver disengages the stops 34 and deflates the springs 22 and 29. In this manner the semi-trailer 1 lowers itself evenly until the minimal ground clearance b has been reached again. The driver removes the catch hook 54 from the cross bolt 53 and moves the semi-trailer forward after having opened the door 12. In this manner the transport frame 40 is separated from the semi-trailer 1.

Prior to the empty return of the vehicle, the stops 34 are re-engaged and the springs re-inflated with compressed air.

What is claimed is:

1. In an inside loader for the over-the-road transport of transport frames, especially for the transport of flat glass in a chassis with parallel longitudinal frame members, in the form of a semi-trailer with a tractor, wherein are articulated axle rockers, supported on their outsides by air suspension bellows, for the support of a plurality of rear wheels, on the inside of which profiled support sections are secured, and wherein the semi-trailer, in order to load a transport frame, is backed up, with air springs deflated and with the longitudinal frame members enclosing the transport frame, in such a way that the support sections of the longitudinal frame members vertically overlap the longitudinal frame members of the transport frame which, after the backing-up is completed, is raised into the transport position by means of inflation of the air spring bellows, the improvement comprising:

a rocker (15) secured to the trailer,
a trailer coupling (16) carried by said rocker,
an air spring (22) supporting said trailer coupling on said rocker,
axle rockers (23) pivotally associated with the rear wheels (5,6,7),
air springs (29) associated with each said axle rocker for maintaining said rockers in transport condition,
stop means (34) carried by the trailer for normally limiting movement of said axle rockers in one direction upon deflation of said air springs to permit emergency operation of the trailer,
said stop means being disengagable to permit unlimited movement of said axle rockers in said one direction for loading and unloading upon deflation of said air springs,
the section heights of the transport sections (51,52) and the longitudinal frame members (38,39) of the transport frame (37) being such that the semi-trailer (1) can be moved with sufficient ground clearance when said stop means are engaged and the air springs (22,24) are deflated, and
the transport sections (51,52) vertically overlap the portions of the longitudinal frame members (38,39) of the transport frame (37) which directly rest on the base (36) of the trailer while providing free play.

2. An inside loader in accordance with claim 1, wherein said stop (34) include a lug cam (32) articulated on the axle rocker (23) next to its air spring support and an abutment (33) for its support on the respective longitundinal frame member (25, 26).

3. An inside loader in accordance with claims 1 or 2, wherein the hollow insides of the longitudinal frame members (25, 26) are used to receive compressed air for inflating the air springs (22, 29).

4. An inside loader in accordance with claims 1, or 2, wherein the support sections are rectangular tubing (51, 52) and the longitudinal frame members (38, 39) are U-sections open to the outside.

5. An inside loader in accordance with claim 3 wherein the support sections are rectangular tubing (51, 52) and the longitudinal frame members (38, 39) are U-sections open to the outside.

6. An inside loader in accordance with claims 1, or 2, wherein a catch hook (54) extends from the forward end (57) for cooperation with a cross member (53) of the transport frame (37), the back of the hook (56) protruding from the forward end (57) for engagement and disengagement of a transport catch (55), formed by the hook.

7. An inside loader in accordance with claim 3 wherein a catch hook (54) extends from the forward end (57) for cooperation with a cross member of the transport frame (37), the back of the hook (56) protruding from the forward end (57) for engagement and disengagement of a transport catch (55), formed by the hook.

* * * * *